US011846535B2

(12) United States Patent
Fredriksson et al.

(10) Patent No.: US 11,846,535 B2
(45) Date of Patent: Dec. 19, 2023

(54) RADAR LEVEL GAUGE WITH SEALING DIELECTRIC FILLING MEMBER AND STRUCTURALLY REINFORCED ELEMENT

(71) Applicant: Rosemount Tank Radar AB, Mölnlycke (SE)

(72) Inventors: Håkan Fredriksson, Linköping (SE); Peter Elmberg, Lindome (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 286 days.

(21) Appl. No.: 16/854,174

(22) Filed: Apr. 21, 2020

(65) Prior Publication Data
US 2020/0355534 A1    Nov. 12, 2020

(30) Foreign Application Priority Data
May 6, 2019 (EP) .................................... 19172814

(51) Int. Cl.
    G01F 23/284    (2006.01)
    H01P 1/08      (2006.01)
    H01Q 1/12      (2006.01)
    H01Q 19/08     (2006.01)
    H01Q 1/22      (2006.01)

(52) U.S. Cl.
    CPC .............. *G01F 23/284* (2013.01); *H01P 1/08* (2013.01); *H01Q 1/1214* (2013.01); *H01Q 1/225* (2013.01); *H01Q 19/08* (2013.01)

(58) Field of Classification Search
    CPC ....... G01F 23/284; H01P 1/08; H01Q 1/1214; H01Q 1/225; H01Q 19/08
    See application file for complete search history.

(56) References Cited

U.S. PATENT DOCUMENTS

| 6,325,391 B1* | 12/2001 | Smith ................... G01F 23/284 |
|               |         | 277/630 |
| 6,661,389 B2  | 12/2003 | Griessbaum et al. |
| 7,683,848 B2  | 3/2010  | Gerding et al. |
| 7,864,104 B2* | 1/2011  | Chen ..................... H01Q 13/02 |
|               |         | 342/124 |
| 8,482,296 B2  | 7/2013  | Reimelt et al. |
| 8,890,759 B2  | 11/2014 | Pantea et al. |
| 2002/0067229 A1 | 6/2002 | Lubbers |

(Continued)

FOREIGN PATENT DOCUMENTS

| DE | 10057441 A1 * | 5/2002 | ........... G01F 23/284 |
| EP | 0 669 673     | 2/1995 | |

OTHER PUBLICATIONS

Communication and Extended European Search Report from EP Application No. 19172814.6, dated Jan. 28, 2020.

*Primary Examiner* — Timothy A Brainard
*Assistant Examiner* — Ismaaeel A. Siddiquee
(74) *Attorney, Agent, or Firm* — Westman, Champlin & Koehler, P.A.

(57) ABSTRACT

A radar level gauge comprising a signal propagation device, a dielectric filling member arranged in the signal propagation device, and a sealing arrangement for preventing tank content from escaping into the outside environment, wherein the dielectric filling member comprises a main body and a sealing arrangement comprising a first sealing portion. The radar level gauge further comprises a structural reinforcement element positioned above the first sealing portion.

17 Claims, 5 Drawing Sheets

(56) References Cited

U.S. PATENT DOCUMENTS

| | | | |
|---|---|---|---|
| 2005/0051457 A1* | 3/2005 | Higgins | H05K 5/061 |
| | | | 206/811 |
| 2007/0279309 A1* | 12/2007 | Schultheiss | G01F 23/284 |
| | | | 343/786 |
| 2011/0221629 A1 | 9/2011 | Edvardsson et al. | |
| 2016/0102793 A1* | 4/2016 | Shimizu | F16J 15/122 |
| | | | 285/368 |
| 2017/0141474 A1 | 5/2017 | Hengstler et al. | |
| 2019/0128728 A1 | 5/2019 | Fredriksson et al. | |

* cited by examiner

RADAR LEVEL GAUGE WITH SEALING DIELECTRIC FILLING MEMBER AND STRUCTURALLY REINFORCED ELEMENT

CROSS-REFERENCE TO RELATED APPLICATION

This application claims priority to European Patent Application No. 19172814.6, filed on May 6, 2019, the content of which is hereby incorporated by reference in its entirety.

TECHNICAL FIELD

The present disclosure relates to a radar level gauge having a dielectric filling member arranged in an antenna arrangement of the radar level gauge, wherein the dielectric filling member comprises a sealing arrangement comprising a first and second sealing portions. The radar level gauge further comprises a structural reinforcement element arranged between the first and second sealing portions.

BACKGROUND

A radar level gauge (RLG) is conventionally used for measurements of a filling level of products such as process fluids, granular compounds and other materials contained in a tank. The RLG can, for example, comprise a transceiver, an antenna arrangement and processing circuit adapted for determining the filling level based on a relation between microwaves transmitted and received by the transceiver.

The RLG may further comprise a so-called dielectric filling member which is positioned in the cavity of the antenna arrangement. The dielectric filling member is arranged to protect the antenna arrangement from the thermal and chemical substances within the tank. The dielectric filling member also serves the purpose as a process seal for preventing tank content to be released to the outside ambient environment. The process seal is conventionally arranged between a portion of the tank and a portion of the antenna arrangement.

The dielectric filling member can however be exposed to relatively high under-pressure forces within the tank. This may cause the dielectric filling member to be forced towards the tank. There is thus a desire to modify the dielectric filling member for improving the resistance to such under-pressure forces.

SUMMARY

It is an object of the present disclosure to describe a radar level gauge having an improved strength for sustaining the relatively high under-pressure forces obtainable in a tank.

According to a first aspect, this and other objects are achieved by a radar level gauge, for determining a process variable of a product in a tank using electromagnetic measuring signals, the radar level gauge comprising an antenna arrangement comprising an antenna mounting structure, the antenna arrangement being adapted to direct a microwave transmit signal toward the product and return reflections thereof from a surface of the product; a dielectric filling member arranged in the antenna arrangement, the dielectric filling member comprising a main body, and a sealing arrangement for preventing tank content from escaping into the outside environment, the sealing arrangement being arranged around a periphery of the main body and comprises a first sealing portion positioned between a portion of the antenna mounting structure and a portion of the tank, wherein a lower surface of the first sealing portion is arranged in abutment with the portion of the tank; and a structural reinforcement element arranged around a periphery of the main body, the structural reinforcement element being arranged in abutment with an upper surface of the first sealing portion such that, as seen in a microwave transmit signal direction, the first sealing portion is positioned above the portion of the tank and below the structural reinforcement element.

The dielectric filling member is intended to mean a sort of seal to protect the antenna arrangement against thermal and chemical impact from the content in the tank. Accordingly, the dielectric filling member should be formed by a dielectric filling material which is water repellent as well as resistant against the chemical substances provided in the tank. The dielectric filling material should also preferably not interfere with the operation of the RLG. According to a non-limiting example, the dielectric filling material may be formed by PTFE (polytetrafluoroethylene). Other alternatives are also conceivable, such as PFA (perfluoroalkoxy alkane) and FEP (fluorinated ethylene propylene). With regards to PTFE, this material can withstand relatively high temperatures, i.e. above 150 degrees C., which is preferable.

Furthermore, the structural reinforcement element should be understood as an element formed by a material having greater resistance to deformation in comparison to the material of the dielectric filling member. According to an example embodiment, the structural reinforcement element may be formed by a material having a stiffness coefficient higher than the stiffness coefficient of the sealing arrangement. The stiffness coefficient is here intended to mean the so-called Young's Modulus which is a measure of the deformation of a material at a specific load condition. According to an example embodiment, the structural reinforcement element may be formed by a metallic material. The metallic material may e.g. be steel.

Moreover, the wording "antenna mounting structure" is a structure that mounts the antenna arrangement to the tank. The antenna mounting structure may form an integral part with the remaining antenna arrangement, or may be arranged as a separate part connected to the antenna arrangement in a suitable manner, such as e.g. screw connected to the antenna arrangement, etc.

An advantage is that an improved seal is provided for preventing tank content from escaping into the outside environment. In detail, the structural reinforcement element will increase the stiffness of the sealing arrangement at the interconnection between the antenna mounting structure and the tank. Hereby, the dielectric filling member is less sensitive to under-pressure from the tank as the structural reinforcement element will prevent the dielectric filling member from being forced towards the inside of the tank. The use of the structural reinforcement element is particularly advantageous during relatively high temperatures when the material in the sealing arrangement tends to undesirable elastically deform. Hereby, the structural reinforcement element will prevent the dielectric filling member from deforming towards the tank. This will in turn improve the measurement quality of the RLG, since it can be assured that the dielectric filling member is maintained at the correct position in the antenna arrangement.

According to an example embodiment, the sealing arrangement may be integrally formed with the main body. The sealing arrangement and the main body may thus be formed in one piece and be of the same material.

According to an example embodiment, the sealing arrangement may further comprise a second sealing surface, the second sealing comprising an upper surface arranged in abutment with the portion of the antenna mounting structure and a lower surface arranged in abutment with the structural reinforcement element.

Preferably, the structural reinforcement element is here positioned between the first and second sealing portions such that, as seen in the microwave transmit signal direction, the first sealing portion is positioned below the structural reinforcement element and the second sealing portion is positioned above the structural reinforcement element. An advantage is that improved sealing towards the antenna mounting structure can be achieved.

According to an example embodiment, the main body may have a substantially conical portion, the first and second sealing portions each being arranged as a respective annular flange extending radially from a base portion of the conical portion.

Furthermore, and according to an example embodiment, the structural reinforcement element may be sandwiched between the first and second sealing portions.

According to an example embodiment, the sealing arrangement may comprise a circumferentially arranged cavity portion formed by sintering an outer end portion of the second sealing portion to the first sealing portion, the structural reinforcement element being arranged in the circumferentially arranged cavity portion.

Hereby, the structural reinforcement element is encapsulated within the circumferentially arranged cavity portion.

According to an example embodiment, the structural reinforcement element may comprise a plurality of through holes extending in the direction between the first and second sealing portions, the first and second sealing portions being connected to each other at the plurality of through holes by sintering the first and second sealing portions to each other.

Hereby, the structural reinforcement element will be well integrated between the first and second sealing portions.

The wording sintering should be understood to mean a process where two elements, i.e. the first and second sealing portions, are integrated by pressing them against each other and heating them without melting.

According to an example embodiment, the structural reinforcement element may comprise a first and a second element portion connected to each other around the main body.

An advantage is that the structural reinforcement element is relatively easy to assemble to the sealing arrangement. According to an example embodiment, the first and second element portions may be formed in a semicircular shape.

The first and second element portions are preferably attached to each other and, according to example embodiment, the first element portion may therefore preferably comprise a protrusion and the second element portion may comprise an indentation, wherein the protrusion is connected to the indentation when connecting the structural reinforcement element around the main body. Using a protrusion and indentation will enable for a so-called snap fit connection between the first and second element portions which will attach the two parts to each other when being arranged at the "correct" position. Hence, no additional connecting element is required.

According to an example embodiment, the structural reinforcement element may comprise at least two layers of reinforcement elements as seen in the microwave transmit signal direction.

Hereby, each layer can be formed by a relatively thin sheet of material. Also, the layers can be arranged to overlap at joints between two of the above described semicircular shaped element portions. Also, the at least two layers of reinforcement elements may preferably be attached to each other. Such attachment may, for example, be realized by a protruding portion of the first layer of material connecting with an indentation of the second layer of material. According to an example embodiment, one of the at least two layers of reinforcement elements may comprise a lip portion and the other one of the at least two layers of reinforcement elements comprises a notch portion for attachment to the lip portion.

Hereby, a snap-fit connection is provided between the layers of reinforcement elements. Thus, no additional attachment element is required, and the layers will be connected to each other when connecting the reinforcement element to the dielectric filling member.

According to an example embodiment, and as indicated above, the main body may be formed by a polymer material. The polymer material may, according to an example embodiment, be a fluoropolymer, preferably PTFE.

BRIEF DESCRIPTION OF THE DRAWINGS

The present disclosure will be described in more detail with reference to the appended drawings, showing currently preferred embodiments of the radar level gauge, where.

DETAILED DESCRIPTION

Figure 1:
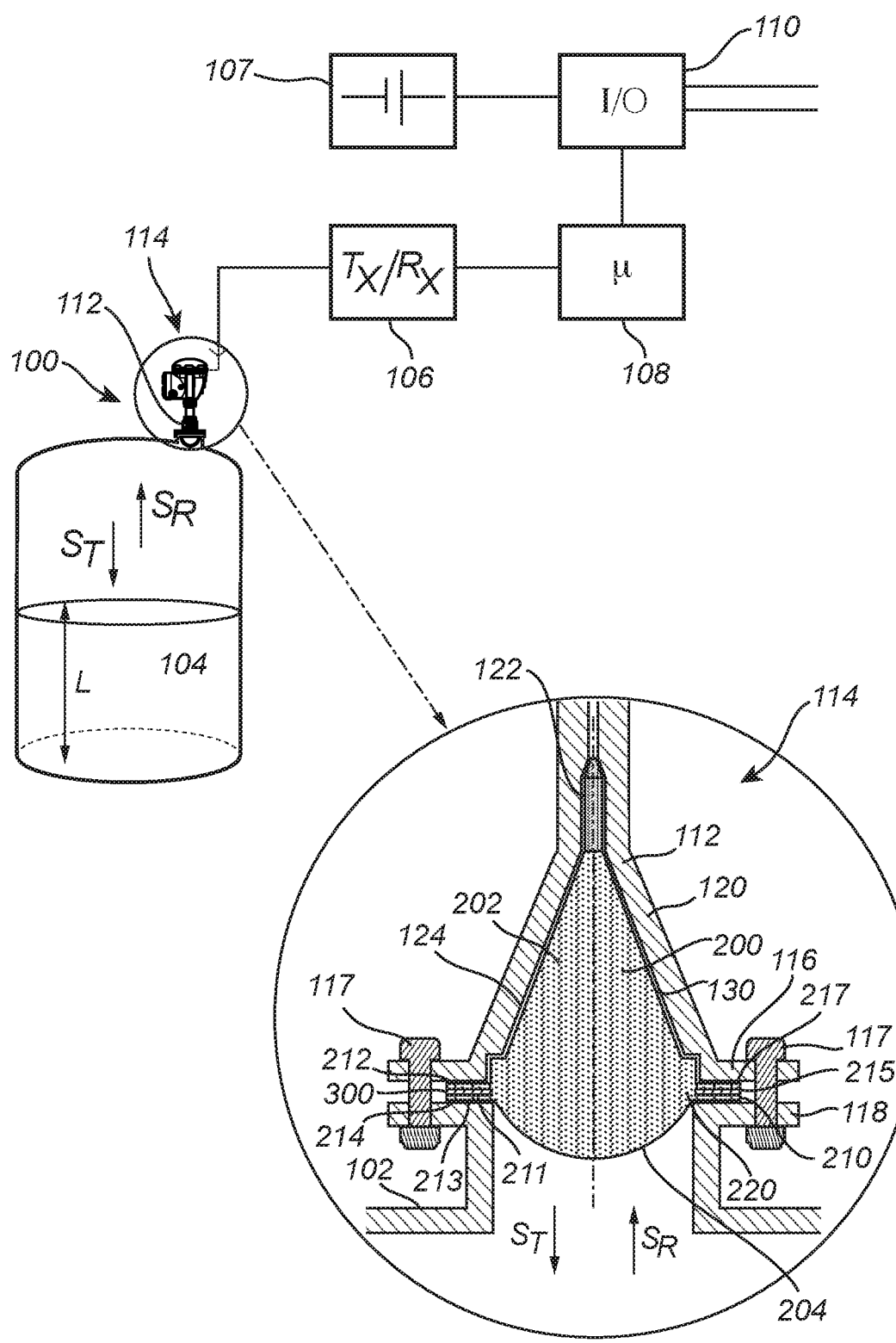
FIG. 1 shows a radar level gauge according to an embodiment of the present invention, mounted on a tank.

With reference to FIG. 1, a radar level gauge (RLG) 100 according to an example embodiment is depicted. The RLG 100 is mounted at an upper portion of the tank 102 and arranged to measure e.g. the depth L of the process content 104 in the tank 102, or the distance from the upper portion of the tank 102 to the surface of the process content 104. The process content 104 can, for example, be a liquid such as gasoline, or a solid material such as a granular compound.

The RLG 100 comprises an antenna arrangement 114 comprising a transceiver circuitry 106, processing circuitry 108 and a signal/power interface 110 connected and powered by a battery 107, which are all illustrated very schematically in FIG. 1. The transceiver circuitry 106, processing circuitry 108 and interface 110 are preferably arranged in a measurement unit (not shown) mounted to a tank connection 112 made of a metal material, typically steel. The tank connection 112 comprises an antenna mounting structure 116 which is adapted to be securely fitted to a portion 118 of the tank 102. FIG. 1 illustrates an example embodiment in which the antenna mounting structure 116 is bolted to the portion 118 of the tank 102 using bolts 117. The antenna mounting structure 116 depicted in FIG. 1 is arranged as an integer part of the tank connection 112. The antenna mounting structure 116 may however equally as well be formed by an additional component connected to the tank connection 112, etc.

The tank connection 112 is adapted to provide a passage (sometimes pressure sealed) for electromagnetic signals through the wall of the tank, which passage connects the transceiver circuitry 106 with the antenna arrangement 114, for allowing signals to propagate into the tank.

The antenna arrangement 114 further comprises a directional antenna 120 with a waveguide section 122 and a horn section 124. The horn section 124 is here formed by the tank connection 112, but may also be a separate part attached to the tank connection 112, e.g. by means of e.g. a threaded fitting.

The transceiver circuitry 106 is configured to generate and transmit an electromagnetic (microwave) transmit signal $S_T$ and receive an electromagnetic (microwave) return signal $S_R$. A coupling arrangement, such as a probe (not shown), is arranged to couple the transmit signal from the transceiver circuitry 106 into the waveguide section 122.

The transceiver circuitry 106 may be a unit capable of transmitting and receiving electromagnetic signals, or may be arranged as a system comprising separate transmitter and receiver units. The elements of the transceiver circuitry 106 are typically implemented in hardware, and form part of an integrated unit normally referred to as a microwave unit. For simplicity, the transceiver circuitry is referred to as the "transceiver" in the following description.

The processing circuitry 108 is configured to determine the distance between a reference position at the top of the tank (such as the passage between the outside and the inside of the tank) and the surface of the tank content by analyzing the transmit signal $S_T$ and the return signal $S_R$. The processing typically includes generation of a tank signal or "echo curve", including a plurality of peaks representing echoes from the interior of the tank. One of the peaks represents an echo from the surface of the tank content. Based on the determined distance to the surface, generally referred to as ullage, and known dimensions of the tank 102, a process variable such as the filling level L of the tank can be determined.

The processing circuitry 108 may include a microprocessor, microcontroller, programmable digital signal processor or another programmable device. The processing circuit may also, or instead, include an application specific integrated circuit, a programmable gate array or programmable array logic, a programmable logic device, or a digital signal processor. Where the processing circuitry 108 includes a programmable device such as the microprocessor, microcontroller or programmable digital signal processor mentioned above, the processor may further include computer executable code that controls operation of the programmable device. The interface 110 is configured to allow communication of a measurement value externally of the RLG and optionally for power supply of the RLG.

In use, the transmit signal $S_T$ generated by the transceiver is coupled into the waveguide section 122, allowed to propagate to the horn section 124 and then emitted into the tank. The transmit signal $S_T$ propagates towards the surface of the tank content 104 and the electromagnetic return signal $S_R$ is caused by a reflection in the surface. The return signal is returned by the antenna 120, allowed to propagate through the waveguide section and is coupled back to the transceiver by the coupling arrangement.

Furthermore, the RLG comprises a dielectric filling member 200. The dielectric filling member 200 is microwave transmissive and arranged at least partly in a cavity 130 formed by the waveguide section 122 and the horn section 124 of the antenna 120. The dielectric filling member 200 is arranged to protect the antenna 120 from the chemical substances as well as the thermal impact from the content within the tank 102. According to an example embodiment, and as will be referred to in the following, the dielectric filling member 200 is preferably made by a polymer material, more preferably PTFE. The PTFE material is chemically resistant and water repellant, which is advantageous in the environment of the tank. PTFE is also advantageous for its temperature resistance properties.

Moreover, the dielectric filling member 200 comprises a main body 202 having a substantially conical shape adapted to fit in the horn section 124 of the antenna 120. A base 204 of the conically shaped main body 202, i.e. the surface facing the interior of the tank, may have a convex shape in order to shape the radar beam of emitted waves in a beneficial manner, and also promote dripping of condensate formed on the filling member.

The dielectric filling member 200 further comprises a sealing arrangement 210 for preventing tank content from escaping into the outside environment. The sealing arrangement 210 is arranged between the antenna mounting structure 116 and the portion 118 of the tank 102. The sealing arrangement 210 is arranged around a periphery of the main body 202 and is preferably formed by the same material as the main body for being integrally formed with the main body 202.

According to the example depicted in FIG. 1, the sealing arrangement 210 comprises a first 214 and a second 212 sealing portion, where the second sealing portion 212 is arranged above the first sealing portion 214 as seen in the transmit signal direction $S_T$. In further detail, the second sealing portion 212 comprises an upper surface 217 arranged in abutment with the antenna mounting structure 116 and the first sealing portion 214 comprises a lower surface 213 arranged in abutment with the portion 118 of the tank 102. Moreover, the first 214 and second 212 sealing portions are each arranged as a respective annular flange extending radially from a base portion 220 of the conical portion of the conically shaped main body 202. The upper surface 211 and the lower surface 213 of the first sealing portion 214 should be interpreted as opposing surface of the first sealing portion 214. Thus, a surface normal of the upper surfaces 211 has an opposite direction compared to a surface normal of the lower surface 213. The same reasoning applies for the upper 217 and lower 215 surfaces of the second sealing portion 212.

Moreover, the RLG also comprises a structural reinforcement element 300 arranged between the first 214 and second 212 sealing portions. In detail, the structural reinforcement element 300 is arranged in abutment with an upper surface 211 of the first sealing portion 214 and arranged in abutment with a lower surface 215 of the second sealing portion 212. Thus, the structural reinforcement element 300 is sandwiched between the first 214 and second 212 sealing portions at an opening formed by the first 214 and second 212 sealing portions. Detailed example embodiments of the structural reinforcement element 300 will be described further below with reference to FIGS. 3a-3d. The structural reinforcement element 300 is preferably formed by a material being stiffer than the material of the dielectric filling member. Hence, the stiffness coefficient, commonly referred to as the Young's modulus, of the structural reinforcement element 300 should preferably be higher than the stiffness coefficient of the dielectric filling member 200. Preferably, the structural reinforcement element 300 is formed by a metallic material, such as e.g. steel.

By positioning a structural reinforcement element 300 in the sealing arrangement 210 between the first 214 and second 212 sealing portions, the stiffness of the sealing arrangement 210 is improved and the dielectric filling member 200 will be more sustainable against under-pressure from the tank 102. The sealing arrangement 210 will also be less sensitive to high temperatures as the coefficient of thermal expansion of the structural reinforcement element 300 is preferably equal to, or lower than the coefficient of thermal expansion of the first and second sealing portions.

Figure 2A:
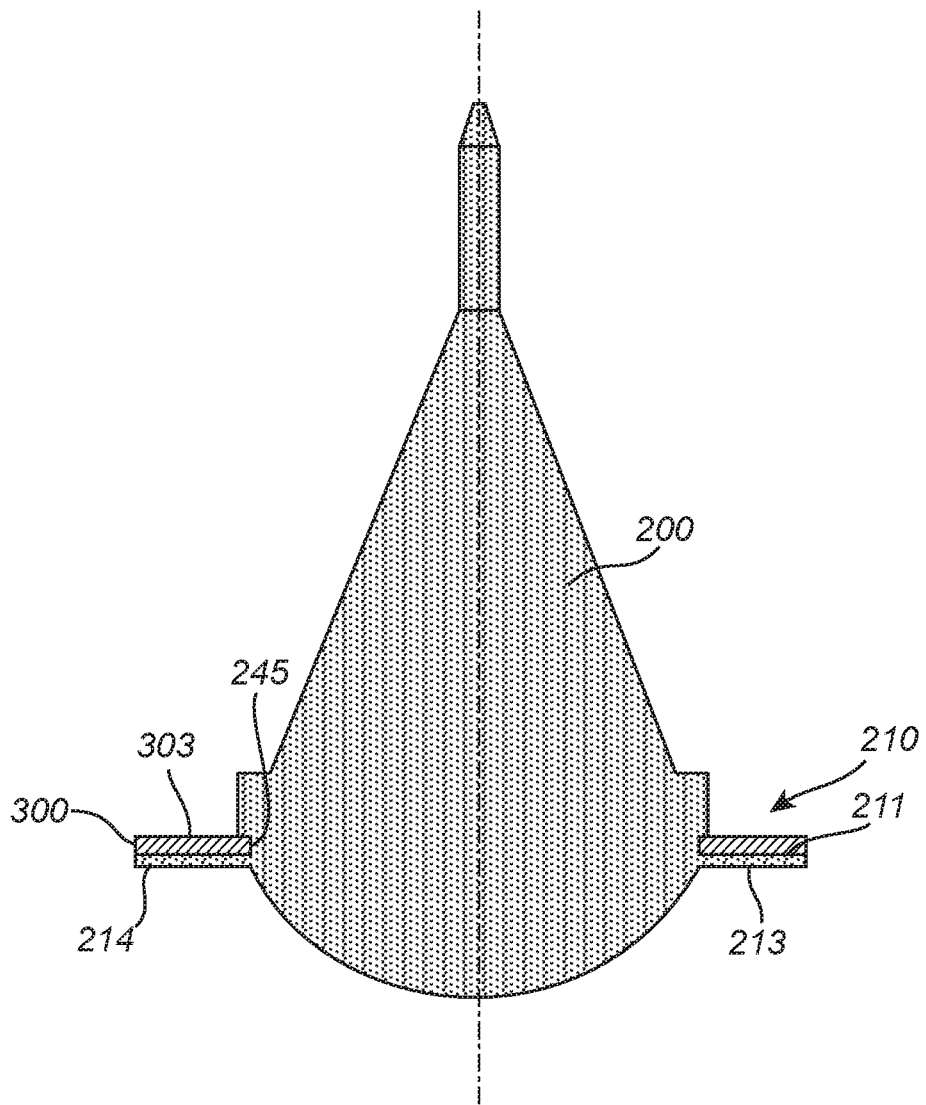
FIG. 2a shows a dielectric filling member and a structural reinforcement element according to an example embodiment.
Figure 2B:
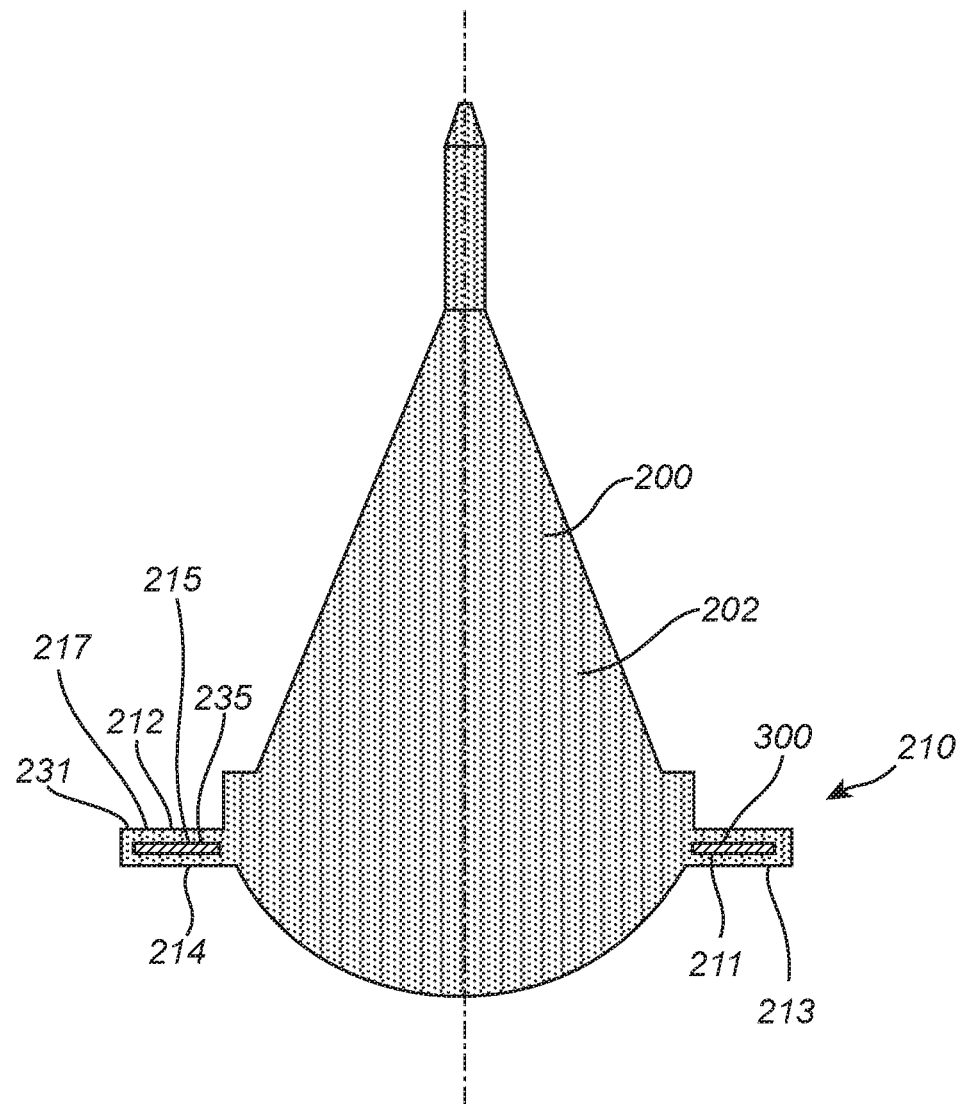
FIG. 2b shows a dielectric filling member and a structural reinforcement element according to another example embodiment.

Reference is now made to FIGS. 2a-2b, in which example embodiments of the sealing arrangement 210 is depicted. In particular, FIGS. 2a-2b illustrate only the dielectric filling member 200 as well as the structural reinforcement element 300. Starting with the example embodiment in FIG. 2a, the sealing arrangement 210 comprises the above described first sealing portion 214. However, instead of using a second sealing portion above the structural reinforcement element 300, an upper surface 303 of the structural reinforcement element 300 will be arranged in abutment with the antenna mounting structure (116 in FIG. 1). Thus, the structural reinforcement element 300 will be connected between the upper surface 211 of the first sealing portion 214 and the antenna mounting structure.

According to an example, and as depicted in the embodiment of FIG. 2a, the dielectric filling member 200 comprises an annular groove 245 into which the structural reinforcement element 300 is connected. Hereby, the structural reinforcement element 300 will be well connected to the sealing arrangement before the sealing arrangement and the structural reinforcement element 300 are fixate between the antenna mounting structure and the portion of the tank.

Turning to FIG. 2b which illustrates the sealing arrangement according to an example embodiment. As can be seen in FIG. 2b, the second sealing portion 212 is sintered to the first sealing portion 214. In particular, an outer portion 231 of the second sealing portion 212 is sintered to the first sealing portion 214. A circumferentially arranged cavity portion 235 is hereby formed, in which cavity portion 235 the structural reinforcement element 300 is positioned. The order in which the first 214 and second 212 sealing portions are sintered to each other, as well as how the first 214 and second 212 sealing portions are sintered to each other are naturally dependent on e.g. the chosen specific manufacturing process.

During manufacturing, the dielectric filling member 200 is preferably formed together with the first sealing portion 214. The structural reinforcement element 300 is positioned on the upper surface 211 of the first sealing portion 214, preferably in a recess or the like formed by the first sealing portion 214. Forming of a recess is not necessary but illustrated merely as an example embodiment. The second sealing portion 212 is thereafter provided to the dielectric filling member 200 by sintering the second sealing portion 212 to the dielectric member 200 as well as to the first sealing portion 214. The cavity portion 235 is thus forming an enclosed portion of the sealing arrangement 210.

The sealing arrangement 210 depicted in FIG. 2b is connected between the antenna mounting structure and the portion of the tank in a similar manner as described above in relation to the embodiment of FIG. 1. Hence, the lower surface 213 of the first sealing portion 214 is arranged in abutment with the portion of the tank, while the upper surface 211 of the first sealing portion 214 is arranged in abutment with the structural reinforcement element 300. The lower surface 215 of the second sealing portion 212 is also arranged in abutment with the structural reinforcement element 300, while the upper surface 217 of the second sealing portion 212 is arranged in abutment with the antenna mounting structure.

Figure 3A:
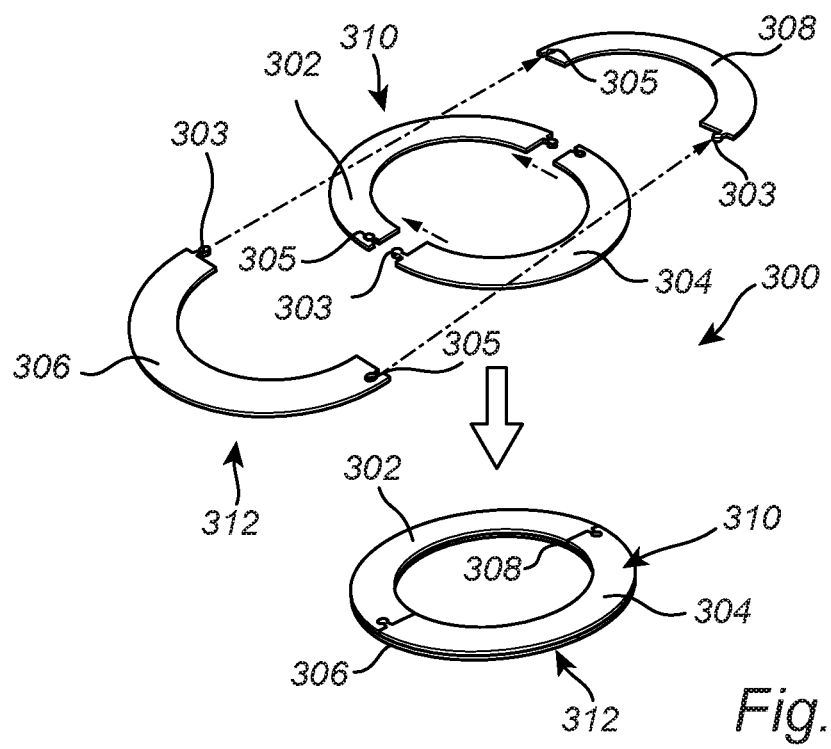
FIGS. 3a-3d show the structural reinforcement element according to various example embodiments.

To describe the structural reinforcement element 300 in further detail, reference is made to FIGS. 3a-3d, which illustrate different example embodiments of the structural reinforcement element 300. With initial reference to FIG. 3a the structural reinforcement element 300 comprises a first 302, a second 304, a third 306 and a fourth 308 element portion. The first element portion 302 is connected to the second element portion 304 around a periphery of the main body 202. The first 302 and second 304 element portions are each formed in a semicircular shape. The first 302 and second 304 element portions are connected to each other by means of a protrusion 303 connecting to an indentation 305. In the embodiment depicted in FIG. 3a, the first element portion 302 comprises a circumferentially extending protrusion 303 at a first end portion thereof, and an indentation 305 at a second end portion thereof. In a similar manner, the second element portion 304 comprises a circumferentially extending protrusion 303 at a first end portion thereof, and an indentation 305 at a second end portion thereof. The protrusion 303 of the first element portion 302 is arranged to mate with the indentation 305 of the second element portion 304, and the protrusion 303 of the second element portion 304 is arranged to mate with the indentation 305 of the first element portion 302. A snap fit connection between a protrusion 303 and an indentation 305 is thus provided. It should however be readily understood that the first element portion 302 can be provided solely with protrusions and the second element portion 304 provided solely with indentations. Also, a further plurality of protrusions/indentations may be provided than what is depicted in FIG. 3a.

Moreover, the third 306 and fourth 308 element portions are connected to each other in a similar manner as the connection between the first 302 and second 304 element portions. Hence, also the third 306 and fourth 308 element portions are provided with protrusions 303 and indentations 305.

The first 302 and second 304 element portions form a first layer 310 of reinforcement elements, while the third 306 and fourth 308 element portions form a second layer 312 of reinforcement elements. As is depicted in FIG. 3a, the first 310 and second 312 layers are arranged on top of each other, whereby the first layer 310 is rotated 90 degrees relative the second layer 312. Hereby, the interface, i.e. the position at which the protrusions and indentations are located, of the first 302 and second 304 element portions will not overlap with the corresponding interface of the third 306 and fourth 308 element portions. The first 310 and second 312 layers form the thickness of the structural reinforcement element as seen in the microwave transmit signal direction $S_T$.

Figure 3B:
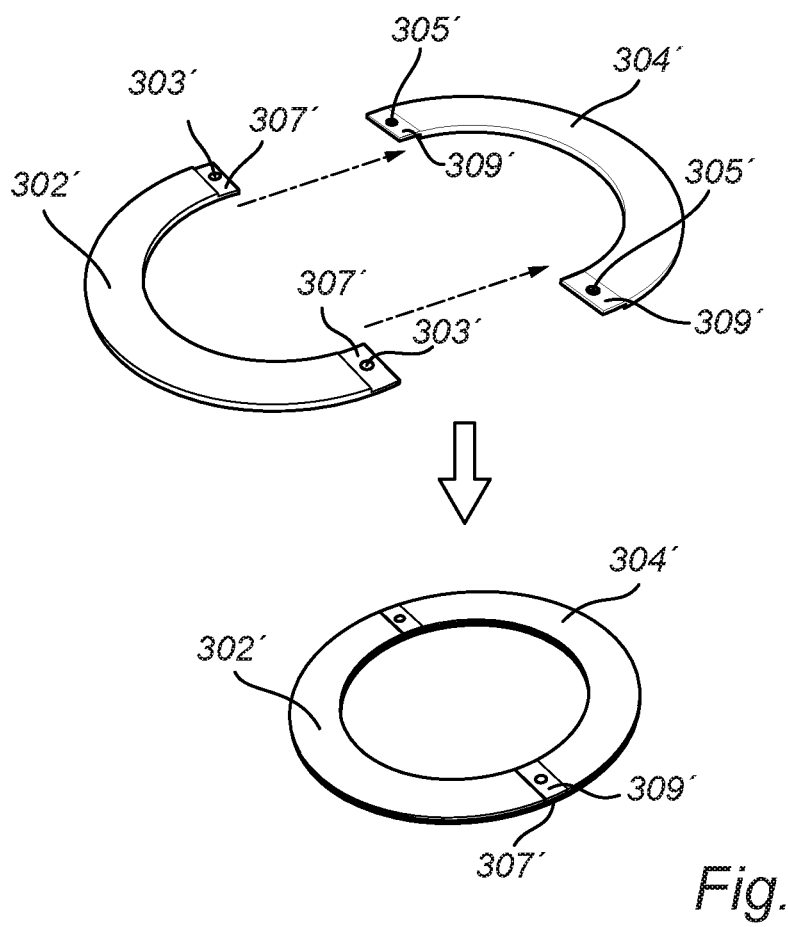

With reference to FIG. 3b, the structural reinforcement element 300' according to another example embodiment is depicted. The structural reinforcement element 300' in FIG. 3b also comprises a first 302' and a second 304' element portion connectable to each other around the periphery of the main body 202. In the example depicted in FIG. 3b, the first element portion 302' comprises a protrusion 303' at a respective end surface portion 307' of the semicircular first element portion 302'. The protrusions 303' extend in the direction between the first and second sealing portions. The second element portion 304' comprises an indentation 305' at a respective end surface portion 309' of the semicircular second element portion 304'. The indentations 305' are arranged in the microwave transmit signal direction.

The end surface portion 307' of the semicircular first element portion 302' preferably comprises a thickness that is thinner than the thickness of the remaining first element portion 302'. Similarly, the end surface portion 309' of the semicircular second element portion 304' preferably comprises a thickness that is thinner than the thickness of the remaining second element portion 304'. As depicted in FIG.

3b, the end surface portion 307' of the semicircular first element portion 302' is arranged to overlap the end surface portion 309' of the semicircular second element portion 304', whereby the protrusions 303' snap-fit with the indentations 305' to interconnect the first 302' and second 304' element portions to each other.

Figure 3C:
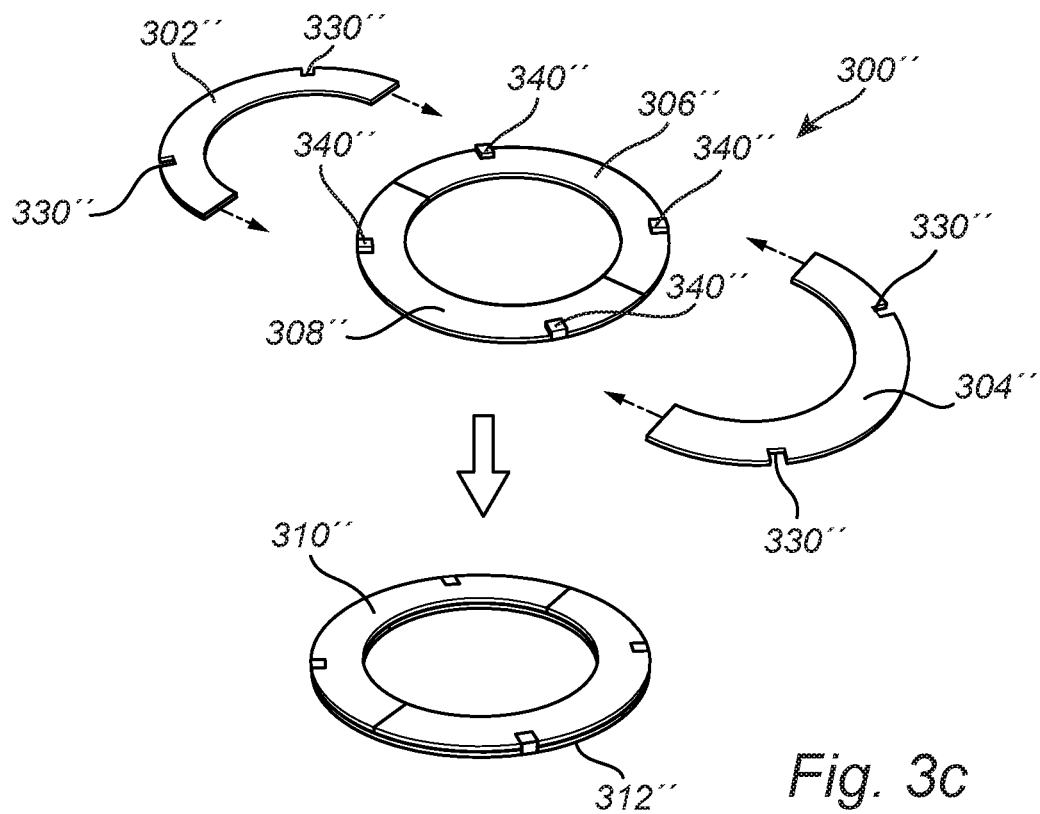

To describe the structural reinforcement element 300" according to a still further example embodiment, reference is made to FIG. 3c. The embodiment depicted in FIG. 3c comprises two layers 310", 312" of reinforcement elements which are connected to each other. The first layer 310" is formed by a first element portion 302" and a second element portion 304", while the second layer 312" is formed by a third element portion 306" and a fourth element portion 308". The first 302" and second 304" element portions comprises notch portions 330" arranged at the periphery thereof, and the third 306" and fourth 308" element portions comprises lip portions 340".

During assembly of the structural reinforcement element 300" in FIG. 3c, the notch portions 330" of the first element portion 302" snap fit with a lip portion 340" of the third 306" and fourth 308" element portions, respectively. In further detail, one notch portion 330" of the first element portion 302" snap fit with a lip portion of the third element portion 306", and another notch portion 330" of the first element portion 302" snap fit with a lip portion of the fourth element portion 308". Similarly, the notch portions 330" of the second element portion 304" snap fit with a lip portion 340" of the third 306" and fourth 308" element portions, respectively. Hereby, the first 302" and second 304" element portions are both connected to each of the third 306" and fourth element portions.

Figure 3D:
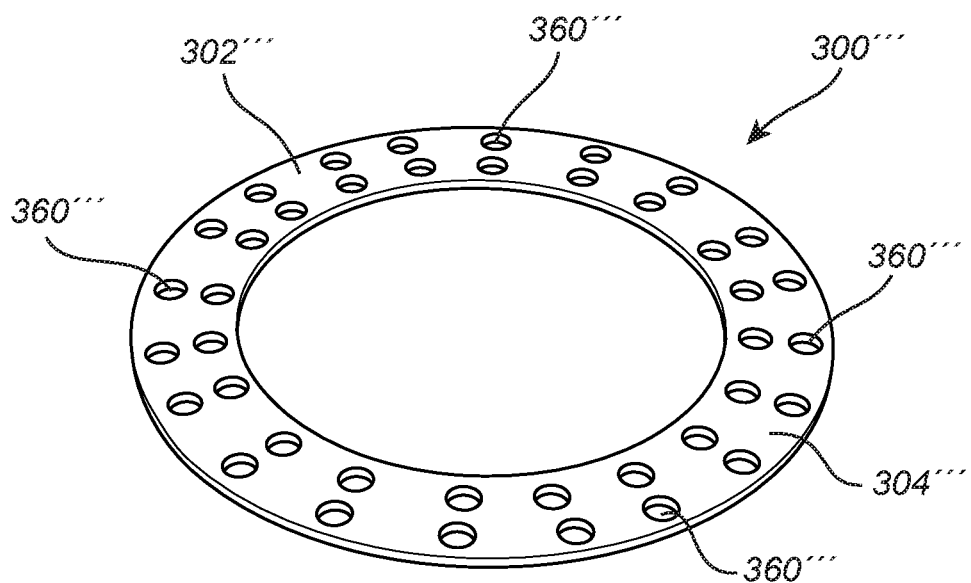

Reference is finally made to FIG. 3d which illustrates yet a further example embodiment of the structural reinforcement element 300"'. As can be seen, the structural reinforcement element 300"' comprises a plurality of through holes 360"'. The through holes 360"' are arranged to extend in the direction between the first 214 and second 212 sealing portions when the structural reinforcement element 300"' is connected to the sealing arrangement. When the structural reinforcement element 300"' is arranged between the first 214 and second 212 sealing portions, the second sealing portion 212 can be sintered to the first sealing portion 214 at the plurality of through holes 360"' for strengthening the connection there between.

As depicted in FIG. 3d, the structural reinforcement element 300"' is arranged as a one-piece element. This embodiment is particularly suitable for use in connection to the embodiment described above in relation to FIG. 2b.

Although the structural reinforcement element 300"' is depicted as a one-piece element in FIG. 3d, it may equally as well be provided with a first and a second element portion as well as provided with two or more layers 310, 312 as depicted in e.g. FIG. 3a. Accordingly, it should be readily understood that the structural reinforcement elements depicted in FIGS. 3b-3c may also be provided with a plurality of through holes in a similar manner as for the embodiment depicted in FIG. 3d.

The person skilled in the art realizes that the present invention by no means is limited to the preferred embodiments described above. On the contrary, many modifications and variations are possible within the scope of the appended claims. For example, the shape and form of the structurally reinforced element may be different than the illustrated examples, depending on the exact application. The plurality of through holes 360"' may, for example, be of different shape and size. Also, the first and second sealing portions may be different in shape and design compared to the illustrated examples. Moreover, the structural reinforcement element 300 depicted in FIG. 3a may be formed by single layer of reinforcement elements while the embodiment depicted in FIG. 3b may be formed by two or more layers.

The invention claimed is:

1. A radar level gauge, for determining a process variable of a product in a tank using electromagnetic measuring signals, the radar level gauge comprising:
    an antenna arrangement comprising an antenna mounting structure, the antenna arrangement being adapted to direct a microwave transmit signal toward the product and return reflections thereof from a surface of the product;
    a dielectric filling member arranged in the antenna arrangement, the dielectric filling member comprising a main body, and a sealing arrangement for preventing tank content from escaping into the outside environment, the sealing arrangement being arranged around a periphery of the main body and comprises a first sealing portion positioned between a portion of the antenna mounting structure and a portion of the tank, wherein a lower surface of the first sealing portion is arranged in abutment with the portion of the tank; and
    a structural reinforcement element formed by a material having a higher stiffness coefficient compared to the stiffness coefficient of the sealing arrangement, the structural reinforcement element being arranged around a periphery of the main body and configured to prevent the dielectric filling member to be forced towards an inside of the tank when the tank is exposed to under-pressure, the structural reinforcement element being arranged in abutment with an upper surface of the first sealing portion such that, as seen in a microwave transmit signal direction, the first sealing portion is positioned above the portion of the tank and below the structural reinforcement element, wherein an upper surface of the structural reinforcement element is arranged in abutment with the antenna mounting structure, whereby the first sealing portion is spaced apart from the antenna mounting structure by the structural reinforcement element.

2. The radar level gauge according to claim 1, wherein the sealing arrangement is integrally formed with the main body.

3. The radar level gauge according to claim 1, wherein the sealing arrangement further comprises a second sealing surface, the second sealing comprising an upper surface arranged in abutment with the portion of the antenna mounting structure and a lower surface arranged in abutment with the structural reinforcement element.

4. The radar level gauge according to claim 3, wherein the main body has a substantially conical portion, the first and second sealing portions each being arranged as a respective annular flange extending radially from a base portion of the conical portion.

5. The radar level gauge according to claim 3, wherein the structural reinforcement element is sandwiched between the first and second sealing portions.

6. The radar level gauge according to claim 3, wherein the sealing arrangement comprises a circumferentially arranged cavity portion formed by sintering an outer end portion of the second sealing portion to the first sealing portion, the structural reinforcement element being arranged in the circumferentially arranged cavity portion.

7. The radar level gauge according to claim 3, wherein the structural reinforcement element comprises a plurality of through holes extending in the direction between the first and second sealing portions, the first and second sealing portions being connected to each other at the plurality of through holes by sintering the first and second sealing portions to each other.

8. The radar level gauge according to claim 1, wherein the structural reinforcement element comprises a first and a second element portion connected to each other around the main body.

9. The radar level gauge according to claim 8, wherein the first and second element portions are formed in a semicircular shape.

10. The radar level gauge according to claim 8, wherein the first element portion comprises a protrusion and the second element portion comprises an indentation, wherein the protrusion is connected to the indentation when connecting the structural reinforcement element around the main body.

11. The radar level gauge according to claim 1, wherein the structural reinforcement element comprises at least two layers of reinforcement elements as seen in the microwave transmit signal direction.

12. The radar level gauge according to claim 11, wherein one of the at least two layers of reinforcement elements comprises a lip portion and the other one of the at least two layers of reinforcement elements comprises a notch portion for attachment to the lip portion.

13. The radar level gauge according to claim 1, wherein the structural reinforcement element is formed by a metallic material.

14. The radar level gauge according to claim 1, wherein the main body is formed by a polymer material.

15. The radar level gauge according to claim 14, wherein the polymer material is a fluoropolymer, preferably PTFE.

16. A radar level gauge, for determining a process variable of a product in a tank using electromagnetic measuring signals, the radar level gauge comprising:
   an antenna arrangement comprising an antenna mounting structure, the antenna arrangement being adapted to direct a microwave transmit signal toward the product and return reflections thereof from a surface of the product, wherein the antenna mounting structure is bolted to a portion of the tank by bolts;
   a dielectric filling member arranged in the antenna arrangement, the dielectric filling member comprising a main body, and a sealing arrangement for preventing tank content from escaping into the outside environment, the sealing arrangement being arranged around a periphery of the main body and comprises a first sealing portion positioned between a portion of the antenna mounting structure and the portion of the tank, wherein a lower surface of the first sealing portion is arranged in abutment with the portion of the tank; and
   a structural reinforcement element arranged around a periphery of the main body, the structural reinforcement element being arranged in abutment with an upper surface of the first sealing portion such that, as seen in a microwave transmit signal direction, the first sealing portion is positioned above the portion of the tank and below the structural reinforcement element, wherein the structural reinforcement element does not extend radially outside the bolts.

17. A radar level gauge, for determining a process variable of a product in a tank using electromagnetic measuring signals, the radar level gauge comprising:
   an antenna arrangement comprising an antenna mounting structure, the antenna arrangement being adapted to direct a microwave transmit signal toward the product and return reflections thereof from a surface of the product;
   a dielectric filling member arranged in the antenna arrangement, the dielectric filling member comprising a main body, and a sealing arrangement for preventing tank content from escaping into the outside environment, the sealing arrangement being arranged around a periphery of the main body and comprises a first sealing portion positioned between a portion of the antenna mounting structure and a portion of the tank, wherein a lower surface of the first sealing portion is arranged in abutment with the portion of the tank; and
   a structural reinforcement element arranged around a periphery of the main body, the structural reinforcement element being arranged in abutment with an upper surface of the first sealing portion such that, as seen in a microwave transmit signal direction, the first sealing portion is positioned above the portion of the tank and below the structural reinforcement element,
wherein the sealing arrangement comprises a circumferentially arranged cavity portion formed by sintering an outer end portion of the second sealing portion to the first sealing portion, the structural reinforcement element being encapsulated in the circumferentially arranged cavity portion.

* * * * *